(12) United States Patent
Palfai et al.

(10) Patent No.: US 8,733,190 B2
(45) Date of Patent: May 27, 2014

(54) STARTER MACHINE SYSTEM AND METHOD (75) Inventors: Balazs Palfai, Fishers, IN (US); Kirk Neet, Pendleton, IN (US); Joel Gray, Fishers, IN (US); Attila Nagy, Fishers, IN (US)

(73) Assignee: Remy Technologies, LLC, Pendleton, IN (US)

( * ) Notice: Subject to any disclaimer, the term of this patent is extended or adjusted under 35 U.S.C. 154(b) by 259 days.

(21) Appl. No.: 13/456,013

(22) Filed: Apr. 25, 2012

(65) Prior Publication Data

US 2013/0283938 A1    Oct. 31, 2013

(51) Int. Cl.
*F02N 15/02*    (2006.01)

(52) U.S. Cl.
USPC .................... 74/7 C; 74/7 E; 123/179.3

(58) Field of Classification Search
USPC ........... 74/6, 7 R, 7 C, 7 E; 123/179.3, 179.4; 477/77
See application file for complete search history.

(56) References Cited

U.S. PATENT DOCUMENTS

| | | | |
|---|---|---|---|
| 5,622,148 A | 4/1997 | Xue et al. |
| 6,011,377 A | 1/2000 | Heglund et al. |
| 6,104,157 A | 8/2000 | Kramer et al. |
| 6,323,562 B1 | 11/2001 | Renner et al. |
| 6,608,394 B2 | 8/2003 | Osada et al. |
| 6,634,332 B2 | 10/2003 | Saito et al. |
| 6,651,603 B2 | 11/2003 | Osada et al. |
| 6,653,807 B2 | 11/2003 | Saito et al. |
| 6,702,718 B2 | 3/2004 | Tani |
| 6,754,579 B2 | 6/2004 | Kamiya et al. |
| 6,817,329 B2 | 11/2004 | Buglione et al. |
| 6,822,544 B2 | 11/2004 | Shiga et al. |
| 7,009,475 B2 | 3/2006 | Niimi et al. |
| 7,027,911 B2 | 4/2006 | Nishikawa et al. |
| 7,066,128 B2 | 6/2006 | Satake et al. |
| 7,177,755 B2 | 2/2007 | Nishikawa et al. |
| 7,218,010 B2 | 5/2007 | Albertson et al. |
| 7,219,007 B2 | 5/2007 | Schuster et al. |
| 7,269,499 B2 | 9/2007 | Murakami |
| 7,275,509 B2 | 10/2007 | Kassner |
| 7,281,510 B2 | 10/2007 | Kondo |

(Continued)

FOREIGN PATENT DOCUMENTS

JP    2002070699    3/2002

OTHER PUBLICATIONS

WIPO Search Report and Written Opinion dated Oct. 29, 2012 for corresponding Application No. PCT/US2012/032801; 3 sheets.

*Primary Examiner* — David M Fenstermacher
(74) *Attorney, Agent, or Firm* — Greenberg Traurig, LLP (57) ABSTRACT

Embodiments of the invention provide a starter machine that includes a motor operatively coupled to a first shaft and a pinion coupled to a second shaft. In some embodiments, a planetary gear drive system can be coupled to the first and the second shafts. The planetary gear drive system can include a planetary gear system and a first clutch being substantially adjacent to a second clutch. The planetary gear drive system can be configured and arranged so that when the first clutch is engaged, the motor can move the pinion at a first rotational speed. The planetary gear drive system is further configured so that when the second clutch is engaged, the motor can move the pinion at a second rotational speed. In some embodiments, the first rotational speed is a greater rotational speed than the second rotational speed.

20 Claims, 9 Drawing Sheets

(56) References Cited

U.S. PATENT DOCUMENTS

| | | | |
|---|---|---|---|
| 7,287,500 B2 | 10/2007 | Izumi et al. | |
| 7,458,353 B2 | 12/2008 | Takahashi | |
| 7,535,328 B2 | 5/2009 | Kurasawa | |
| 7,628,138 B2 | 12/2009 | Ando | |
| 7,701,104 B2 | 4/2010 | Akemakou | |
| 7,733,201 B2 | 6/2010 | Yoneshima | |
| 7,760,056 B2 | 7/2010 | Utsunomiya et al. | |
| 7,797,099 B2 | 9/2010 | Terada | |
| 7,848,875 B2 | 12/2010 | Nakai | |
| 7,861,683 B2 | 1/2011 | Saitoh | |
| 7,934,436 B2 | 5/2011 | Laubender | |
| 7,949,461 B2 | 5/2011 | Takahashi | |
| 7,973,623 B2 * | 7/2011 | Andoh | 335/126 |
| 7,982,565 B2 | 7/2011 | Bradfield et al. | |
| 8,036,815 B2 | 10/2011 | Okumoto et al. | |
| 8,069,832 B2 | 12/2011 | Okumoto et al. | |
| 8,169,281 B2 * | 5/2012 | Andoh | 335/126 |
| 8,192,327 B2 * | 6/2012 | Gibson et al. | 477/77 |
| 8,192,328 B2 * | 6/2012 | Nedorezov et al. | 477/94 |
| 8,299,639 B2 * | 10/2012 | Usami et al. | 290/38 R |
| 8,302,575 B2 * | 11/2012 | Senda et al. | 123/179.4 |
| 8,413,635 B2 * | 4/2013 | Machida et al. | 123/339.14 |
| 8,574,122 B2 * | 11/2013 | Gibson et al. | 477/77 |
| 2002/0017260 A1 * | 2/2002 | Saito et al. | 123/179.3 |
| 2002/0053961 A1 * | 5/2002 | Kajino | 335/126 |
| 2003/0150417 A1 | 8/2003 | Miwa | |
| 2003/0209373 A1 | 11/2003 | Egami et al. | |
| 2004/0168664 A1 | 9/2004 | Senda et al. | |
| 2006/0058897 A1 | 3/2006 | Senda et al. | |
| 2006/0117876 A1 | 6/2006 | Lepres et al. | |
| 2006/0201266 A1 | 9/2006 | Kajino et al. | |
| 2006/0220771 A1 * | 10/2006 | Hirabayashi | 335/282 |
| 2007/0199533 A1 | 8/2007 | Takahashi | |
| 2008/0162007 A1 * | 7/2008 | Ishii et al. | 701/54 |
| 2009/0020091 A1 | 1/2009 | Botzenhard et al. | |
| 2009/0183595 A1 | 7/2009 | Niimi | |
| 2009/0224557 A1 | 9/2009 | Reynolds et al. | |
| 2009/0295399 A1 | 12/2009 | Ueda et al. | |
| 2010/0000487 A1 | 1/2010 | Hoshino et al. | |
| 2010/0033066 A1 | 2/2010 | Murata et al. | |
| 2010/0036591 A1 | 2/2010 | Nakai | |
| 2010/0059007 A1 | 3/2010 | Senda et al. | |
| 2010/0083926 A1 | 4/2010 | Okumoto et al. | |
| 2010/0090526 A1 | 4/2010 | Itou | |
| 2010/0180849 A1 | 7/2010 | Senda et al. | |
| 2010/0184562 A1 | 7/2010 | Senda et al. | |
| 2010/0217484 A1 | 8/2010 | Mizuno | |
| 2010/0217493 A1 | 8/2010 | Tomura et al. | |
| 2010/0222973 A1 | 9/2010 | Senda et al. | |
| 2010/0229815 A1 | 9/2010 | Senda et al. | |
| 2010/0242905 A1 | 9/2010 | Machida et al. | |
| 2010/0251851 A1 | 10/2010 | Usami | |
| 2010/0251852 A1 | 10/2010 | Murata et al. | |
| 2010/0251853 A1 | 10/2010 | Usami et al. | |
| 2010/0256896 A1 | 10/2010 | Kitano et al. | |
| 2010/0257975 A1 | 10/2010 | Niimi et al. | |
| 2010/0264670 A1 | 10/2010 | Usami et al. | |
| 2010/0264764 A1 | 10/2010 | Usami et al. | |
| 2010/0264765 A1 | 10/2010 | Haruno et al. | |
| 2010/0269630 A1 | 10/2010 | Niimi et al. | |
| 2010/0269631 A1 | 10/2010 | Niimi et al. | |
| 2010/0269776 A1 | 10/2010 | Mizuno | |
| 2010/0282199 A1 | 11/2010 | Heyers et al. | |
| 2010/0282200 A1 | 11/2010 | Notani | |
| 2011/0001589 A1 | 1/2011 | Usami et al. | |
| 2011/0005486 A1 | 1/2011 | Nakamura | |
| 2011/0056450 A1 | 3/2011 | Notani | |
| 2011/0084786 A1 | 4/2011 | Niimi et al. | |
| 2011/0095852 A1 | 4/2011 | Niimi et al. | |
| 2011/0112740 A1 | 5/2011 | Hashimoto | |
| 2011/0115238 A1 | 5/2011 | Biessenberger et al. | |
| 2011/0118962 A1 | 5/2011 | Couetoux et al. | |
| 2011/0132308 A1 * | 6/2011 | Liu et al. | 123/179.4 |
| 2011/0137544 A1 | 6/2011 | Kawazu et al. | |
| 2011/0139108 A1 | 6/2011 | Hashim | |
| 2011/0146609 A1 | 6/2011 | Enoki | |
| 2011/0174255 A1 | 7/2011 | Neuburger et al. | |
| 2011/0184626 A1 | 7/2011 | Mauritz et al. | |
| 2011/0248803 A1 | 10/2011 | Niimi et al. | |
| 2012/0035837 A1 | 2/2012 | Okumoto et al. | |

* cited by examiner

Figure 7B (Second Clutch Engaged)

Figure 7C — TRANSITIONAL STATE

STARTER MACHINE SYSTEM AND METHOD

BACKGROUND

Some electric machines can play important roles in vehicle operation. For example, some vehicles can include a starter machine, which can, upon a user closing an ignition switch, lead to cranking of engine components of the vehicle. Some starter machines can include a field assembly that can produce a magnetic field to rotate some starter machine components.

SUMMARY

Some embodiments of the invention provide a starter machine that can include a motor that can be operatively coupled to a first shaft and a pinion that can be operatively coupled to a second shaft. In some embodiments, a planetary gear drive system can be coupled to the first and the second shafts. In some embodiments, the planetary gear drive system can include a planetary gear system and a first clutch that can be substantially adjacent to a second clutch. In some embodiments, the planetary gear drive system can be configured and arranged so that when the first clutch is engaged, the motor can move the pinion at a first rotational speed. In some embodiments, the planetary gear drive system can be configured so that when the second clutch is engaged, the motor can move the pinion at a second rotational speed. In some embodiments, the first rotational speed can comprise a greater rotational speed than the second rotational speed.

DESCRIPTION OF THE DRAWINGS

FIG. 6 is a partial cross-sectional view of a planetary gear drive system according to one embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 1:
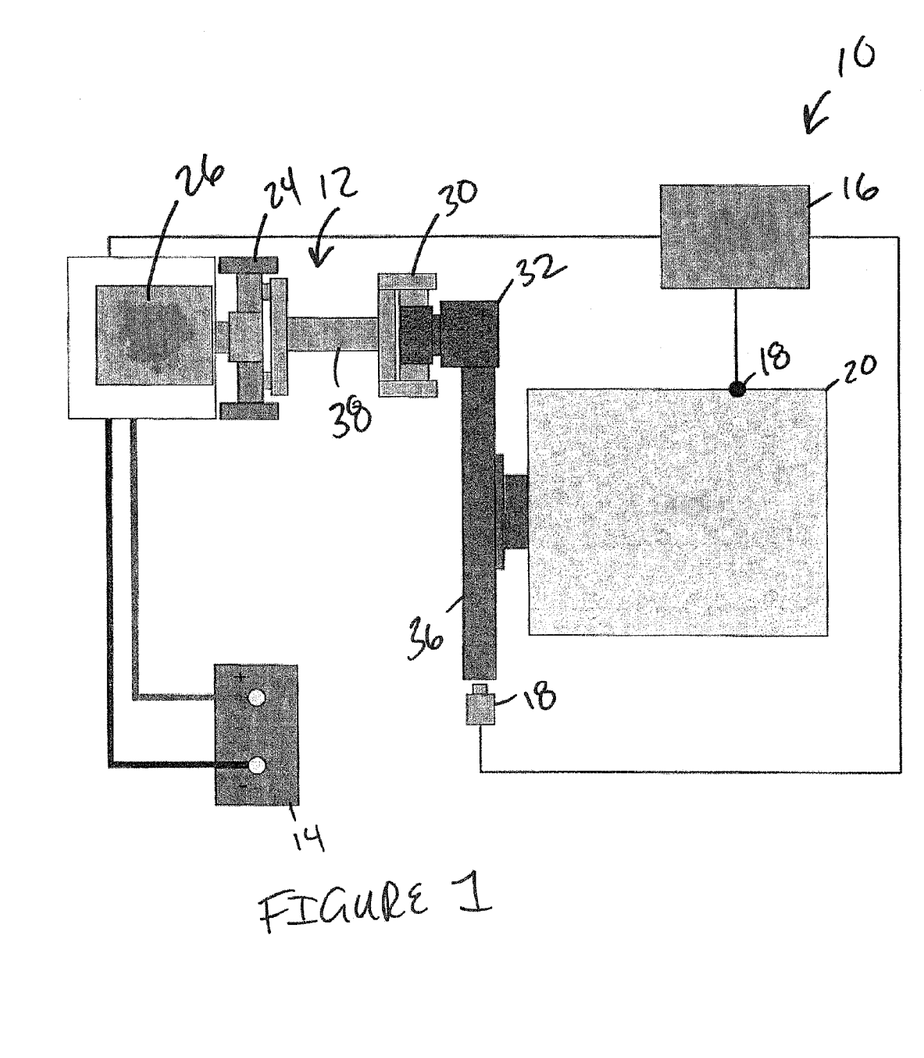
FIG. 1 is a diagram of a starter machine control system according to one embodiment of the invention.

FIG. 1 illustrates a starter machine control system 10 according to one embodiment of the invention. The system 10 can include an electric machine 12, a power source 14, such as a battery, an electronic control unit 16, one or more sensors 18, and an engine 20, such as an internal combustion engine. In some embodiments, a vehicle, such as an automobile, can comprise the system 10, although other vehicles can include the system 10. In some embodiments, non-mobile apparatuses, such as stationary engines, can comprise the system 10.

The electric machine 12 can be, without limitation, an electric motor, such as a hybrid electric motor, an electric generator, a starter machine, or a vehicle alternator. In one embodiment, the electric machine can be a High Voltage Hairpin (HVH) electric motor or an interior permanent magnet electric motor for hybrid vehicle applications.

Figure 2:
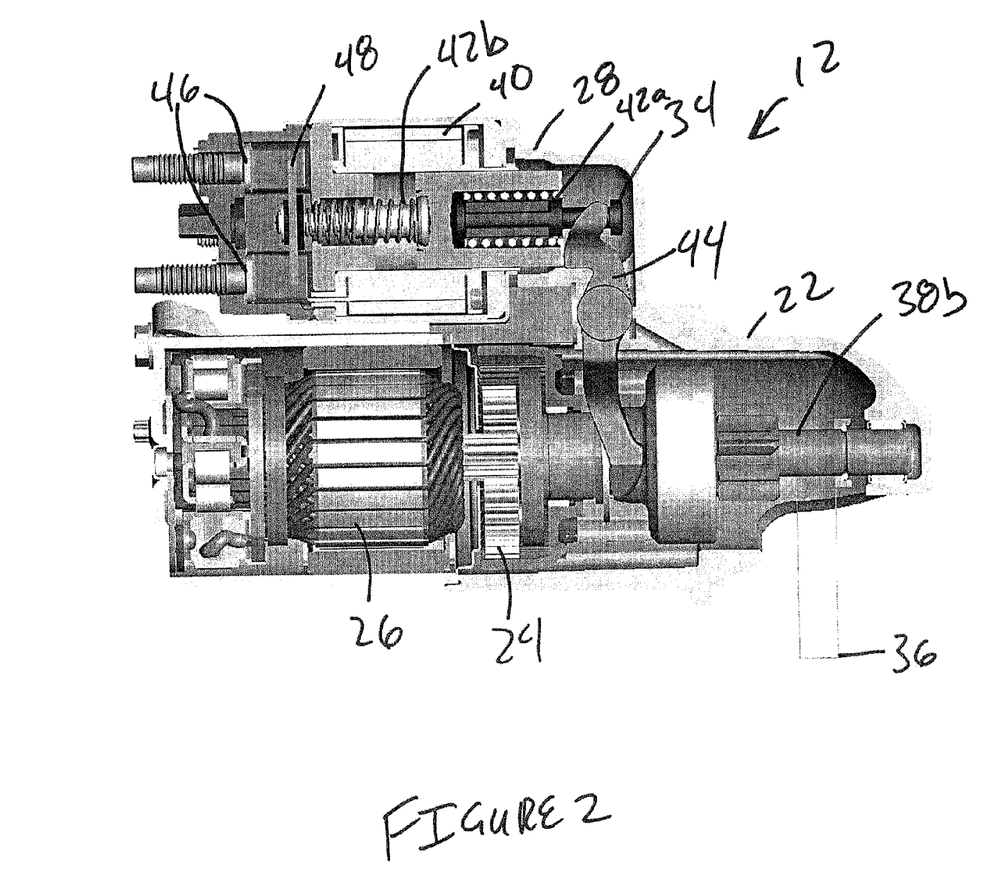
FIG. 2 is a cross-sectional view of a conventional starter machine according to some embodiments of the invention.
Figure 3:
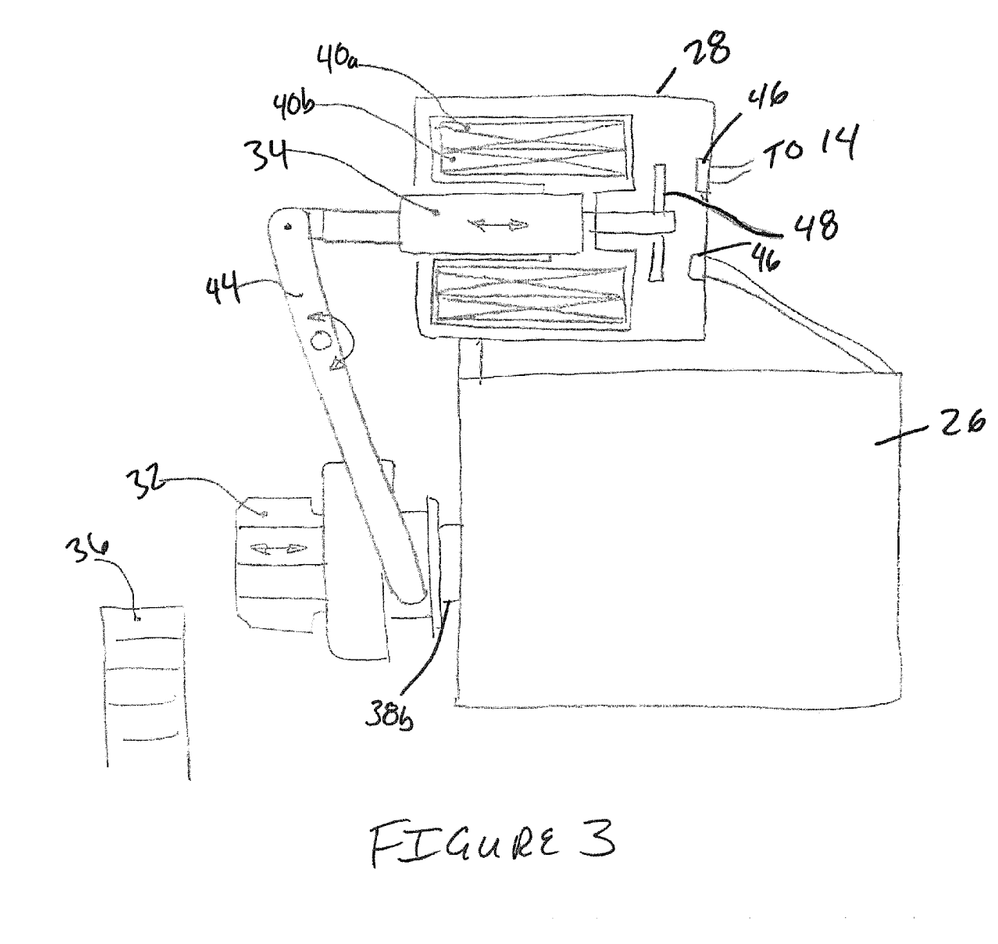
FIG. 3 is a cross-sectional view of a conventional starter machine according to some embodiments of the invention.

As shown in FIGS. 2 and 3, in some embodiments, the electric machine 12 can comprise a starter machine 12. In some embodiments, the starter machine 12 can comprise a housing 22, a gear train 24, a brushed or brushless motor 26, a solenoid assembly 28, a clutch 30 (e.g., an overrunning clutch), and a pinion 32. In some embodiments, the starter machine 12 can operate in a generally conventional manner. For example, in response to a signal (e.g., a user closing a switch, such as an ignition switch), the solenoid assembly 28 can cause a plunger 34 to move the pinion 32 into an engagement position with a ring gear 36 of a crankshaft of the engine 20. Further, the signal can lead to the motor 26 generating an output (e.g., torque), which can be translated through the gear train 24 to the pinion 32 engaged with the ring gear 36. As a result, in some embodiments, the pinion 32 can move the ring gear 36, which can crank the engine 20, leading to engine 20 ignition. Further, in some embodiments, the clutch 30 can aid in reducing a risk of damage to the starter machine 12 and the motor 26 by disengaging the pinion 32 from a shaft 38 connecting the pinion 32 and the motor 26 (e.g., allowing the pinion 32 to free spin if it is still engaged with the ring gear 36).

In some embodiments, the starter machine 12 can comprise multiple configurations. For example, in some embodiments, the solenoid assembly 28 can comprise one or more configurations. In some embodiments, the solenoid assembly can comprise the plunger 34, a coil winding 40, and a plurality of solenoid biasing members 42 (e.g., springs or other structures capable of biasing portions of the solenoid assembly 28). In some embodiments, a first end of a shift lever 44 can be coupled to the plunger 34 and a second end of the shift lever 44 can be coupled to the pinion 32 and/or a shaft 38 that can operatively couple together the motor 26 and the pinion 32.

As a result, in some embodiments, at least a portion of the movement created by the solenoid assembly 28 can be transferred to the pinion 32 via the shift lever 44 to engage the pinion 32 with the ring gear 36, as previously mentioned. Moreover, in some embodiments, the starter machine 12 can comprise a plurality of shafts 38 that can be configured and arranged to transfer movement from the motor 26 to the pinion 32. For example, in some embodiments, the starter machine 12 can comprise a first shaft 38a that can be operatively coupled to the motor 26 and can be also be operatively coupled to the gear train 24 or other apparatus and the pinion 32 can be operatively coupled to a second shaft 38b, which can also be coupled to the gear train 24 or other apparatus, as discussed in greater detail below.

Moreover, as shown in FIG. 3, the solenoid assembly 28 can comprise at least a first solenoid biasing member 42a and a second solenoid biasing member 42b. When the starter machine 12 is activated (e.g., by the user closing the ignition switch), the system 10 can energize the coil winding 40, which can cause movement of the plunger 34 (e.g., in a generally axial direction). For example, current flowing through the coil winding 40 can draw-in or otherwise move the plunger 34, and this movement can be translated to engagement of the pinion 32, via the shift lever 44 (i.e., the magnetic field created by current flowing through coil winding 40 can cause the plunger 34 to move). Moreover, the plunger 34 moving inward as a result of the energized coil winding 40 can at least partially compress the first solenoid biasing member 42a.

Additionally, in some embodiments, the plunger 34 can be drawn-in or otherwise moved to a position (e.g., an axially inward position) so that at least a portion of the plunger 34 (e.g., a lateral end of the plunger 34) can at least partially engage or otherwise contact one or more contacts 46 to close a circuit that provides current to the motor 26 from the power source 14. As a result, the motor 26 can be activated by the current flowing through the circuit closed by the plunger 34. For example, in some embodiments, the plunger 34 can comprise a plunger contact 48 that can engage the contacts 46 to close the circuit to enable current to flow to the motor 26. In some embodiments, the second solenoid biasing member 42b can be coupled to and/or disposed over at least a portion of the plunger 34 at a position substantially adjacent to the plunger contact 48, as shown in FIG. 2. In some embodiments, the second solenoid biasing member 42b can function to assist the first solenoid biasing member 42a in returning the plunger 34 to the home position. Additionally, in some embodiments, the second solenoid biasing member 42b can also function to assist in separating the plunger contact 48 and the contacts 46 (e.g., the biasing force of the compressed second solenoid biasing member 42b can aid in moving the plunger contact 48 away from the contacts 46).

In some embodiments, after partial or total completion of the starting event (e.g., the engine has at least partially turned over and combustion has begun), the coil winding 40 can be at least partially de-energized. In some embodiments, the reduction or removal of force retaining the plunger 34 in place (e.g., the magnetic field created by current flowing through the coil winding 40) can enable the compressed biasing members 42 to expand. As a result, the first solenoid biasing member 42a can expand and return the plunger 34 to its original position before the energization of the coil winding 40 (i.e., a "home" position). Accordingly, the pinion 32 can be withdrawn from the ring gear 36 and return to its original position within the housing 22. Additionally, in some embodiments, the solenoid assembly 28 can also comprise, a greater or few numbers of biasing members 42 to aid in functioning of the solenoid assembly 28.

As shown in FIG. 2, in some embodiments, the solenoid assembly 28 can comprise more than one coil winding 40. For example, as shown in FIG. 3, the solenoid assembly 28 can comprise two coil windings 40. In other embodiments, the solenoid assembly 28 can comprise more than two coil windings 40 (not shown). In some embodiments, the solenoid assembly 28 can comprise a first coil winding 40a and a second coil winding 40b. In some embodiments, the first coil winding 40a can be configured and arranged to function as a "pull-in" coil winding 40 and the second coil winding 40b can be configured and arranged to function as a "hold-in" coil winding 42, or vice versa. For example, the first coil winding 40a can be initially activated by the electronic control unit 16 to initially move the plunger 34 from the home position. In some embodiments, the first coil winding 40a can move the plunger 36 until the contacts 46, 48 engage to close the circuit (i.e., the first coil windings 40a can function to initially "pull-in" the plunger 34) and to move the pinion 32 into engagement with the ring gear 36 and to energize the motor 26. In some embodiments, the second coil winding 40b can be activated upon the contacts 46, 48 engaging or another signal resulting from the plunger 34 moving. Upon activation, the second coil winding 40b can function to retain or "hold-in" the plunger 36 during a starting episode. Moreover, during activation of the second coil winding 40b, the solenoid assembly 28 can be configured and arranged so that the first coil winding 40a is substantially or completely deactivated by the activation of the second coil winding 40b. For example, the second coil winding 40b can comprise a greater resistance and, as a result, a lesser current relative to the first coil winding 40a. Accordingly, the second coil winding 40b can operate at a lower temperature relative to the first coil windings 40a, and, as a result, can operate for longer periods of time because of the lesser thermal output by the winding 40b. In some embodiments, after the engine 20 has been started, the second coil winding 40b can be substantially or completely deactivated and biasing members 42 can move the plunger 34 back to the home position.

In some embodiments, the coil windings 40a, 40b can be coupled to and/or in communication with the electronic control unit 16 and the power source 14. For example, as previously mentioned, current can circulate through the coil windings 40a, 40b to move the plunger 34, and, as a result, move the pinion 32 toward the ring gear 36. In some embodiments, the current circulating through the coil windings 40a, 40b can originate from the power source 14 (e.g., the battery). Moreover, in some embodiments, the electronic control unit 16 can control the current flow to one, some, or all of the coil windings 40a, 40b from the power source 14 so that the plunger 34 moves upon the electronic control unit 16 transmitting the necessary signals for current to flow to the coil windings 40a, 40b.

Figure 4:
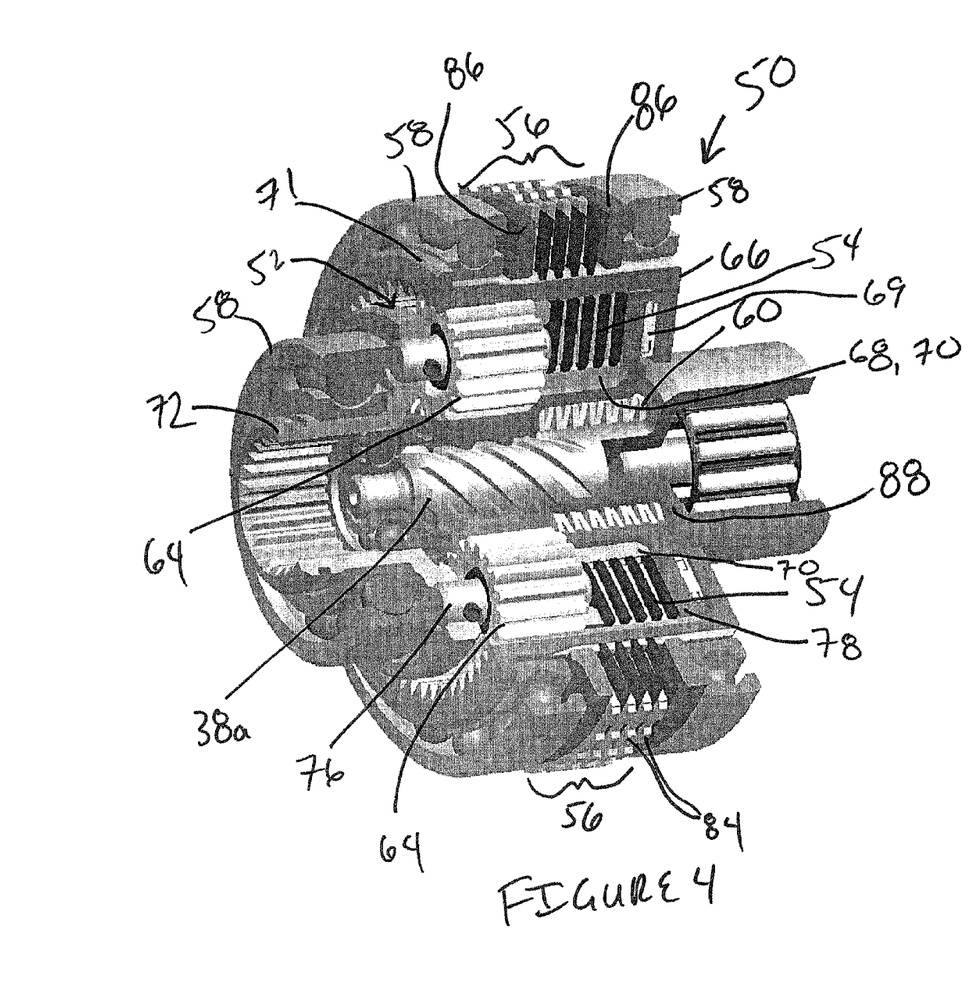
FIG. 4 is a partial cross-sectional view of a planetary gear drive system according to one embodiment of the invention.

In some embodiments, in addition to, or in lieu of, the gear train 24 and/or the clutch 30, the starter machine 12 can comprise one or more planetary gear drive systems 50. In some embodiments, the planetary gear drive system 50 can comprise a planetary gear system 52, a first clutch 54, a second clutch 56, and a plurality of bearings 58, and at least one clutch biasing member 60, as shown in FIG. 4. In some embodiments, the planetary gear drive system 50 can be coupled to the first shaft 38a and the second shaft 38b to aid in moving the pinion 32. As described in further detail below, in some embodiments, the planetary gear drive system 50 can be configured and arranged so that some or all of the output of the motor 26 (torque, power, etc.) that is transferred to the pinion 32 initially passes from the first shaft 38a through the planetary gear drive system 50 to the second shaft 38b. For example, in some embodiments, the planetary gear drive system 50 can be configured to augment the torque of the motor 26 so that under some conditions, the pinion 32 can move at greater rotational speeds while transmitting less torque to the ring gear 36 than under other conditions, when the pinion 32 can move at lesser rotation speeds while transmitting greater amounts of torque to the ring gear 36.

In some embodiments, the planetary gear system 52 can comprise a sun gear 62, one or more planet gears 64, and a drive ring gear 66. In some embodiments, the planetary gear system 52 can comprise a generally conventional planetary gear configuration. In some embodiments, the sun gear 62 can be coupled to a portion of the first shaft 38a so that at least a portion of the motor 26 output can be transferred from the first shaft 38a to the sun gear 62. For example, as shown in FIG. 4, a portion of an outer surface the first shaft 38a can comprise a splined configuration (e.g., a helical spline configuration) and a portion of an inner surface of the sun gear 62 can comprise a splined configuration (e.g., a helical spline configuration) that can be configured and arranged to engage the splined configuration of the first shaft 38a.

Figure 5:
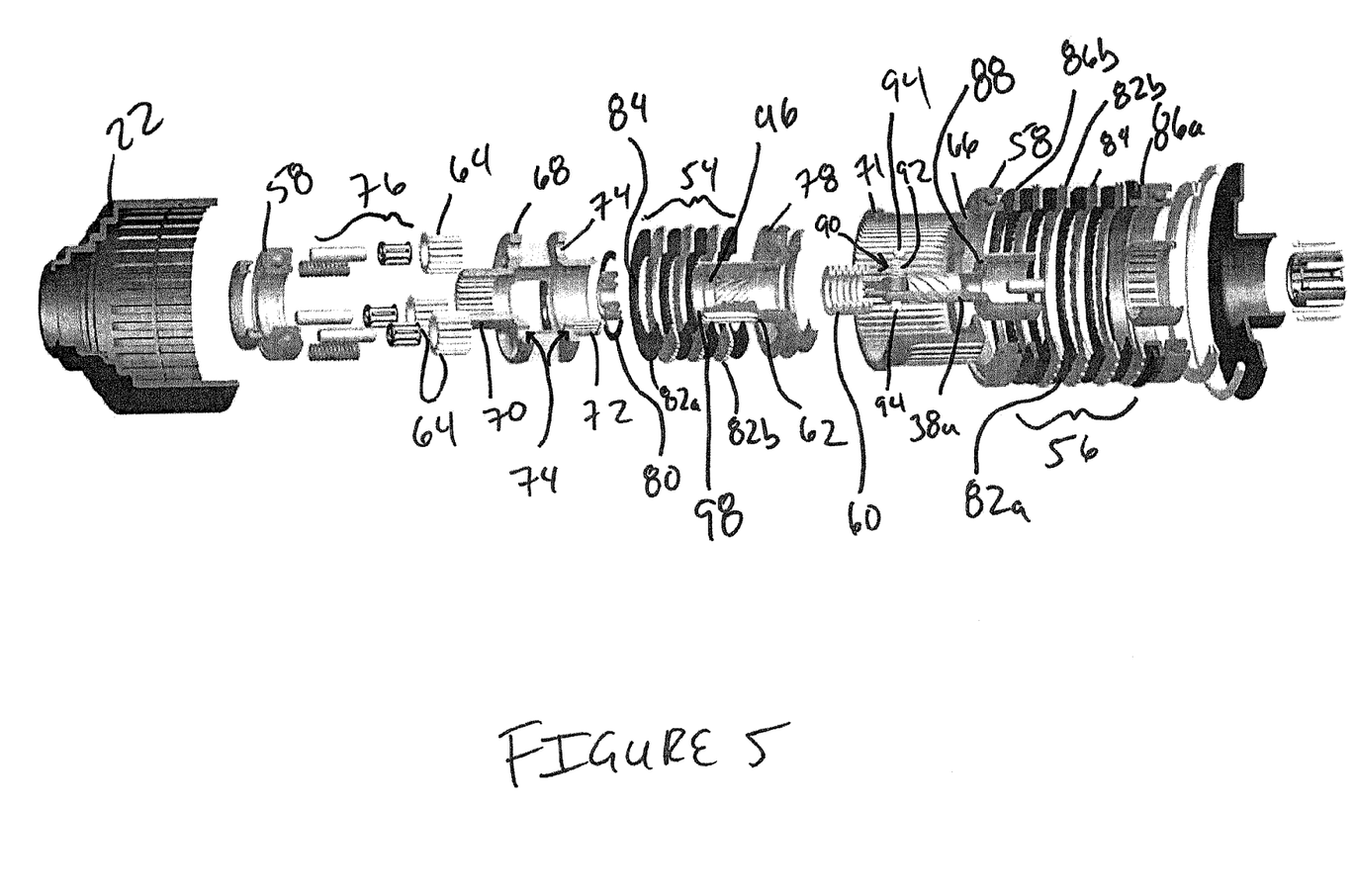
FIG. 5 is an exploded view of a planetary gear drive system according to one embodiment of the invention.

In some embodiments, the planetary gear drive system 50 can comprise one or more carriers 68. As shown in FIGS. 4 and 5, in some embodiments, the carrier 68 can be disposed substantially adjacent to the sun gear 62 and can at least partially support the planet gears 64. For example, in some embodiments, the carrier 68 can be positioned so that at least a portion of the carrier 68 circumscribes at least a portion of the sun gear 62, as shown in FIGS. 4 and 5. Moreover, in some embodiments, the carrier 68 can comprise a first collar 70 and a second collar 72. In some embodiments, the first collar 70 and the second collar 72 can be disposed on substantially opposite axial sides of the carrier 68, although the collars 70, 72 can be disposed in other locations on the carrier 68 (e.g., the same axial side). In some embodiments, the collars 70, 72 can comprise substantially similar sizes (e.g., circumference, diameter, perimeter, etc.), and in some embodiments, the first collar 70 can comprise a greater size (e.g., a greater circumference) relative to the second collar 72 or vice versa. As a result, in some embodiments, the sun gear 62 can be at least partially received within the carrier 68 via the first and/or second collar 70, 72.

In some embodiments, the carrier 68 can at least partially support the planet gears 64. As shown in FIGS. 4 and 5, the carrier 68 can comprise one or more carrier apertures 74 disposed through a portion of the carrier 68. In some embodiments, the carrier apertures 74 can be axially disposed and configured and arranged to receive a planet gear 64 and one or more coupling members 76, as shown in FIGS. 4 and 5. For example, as shown in FIG. 4, in some embodiments, the planet gears 64 can be disposed between generally axially-aligned carrier apertures 74 so that a coupling member 76 can be disposed through the carrier apertures 74 and the planet gears 64. As a result, in some embodiments, the planet gears 64 can be supported by the carrier 68 and the coupling members 76.

Moreover, in some embodiments, the planet gears 64 can be coupled to the carrier 68 so that the planet gears 64 comprise a movable (e.g., rotatable) configuration. As shown in FIGS. 4 and 5, at least a portion of outer surfaces of the sun gear 62 and the planet gears 64 can comprise teeth that can be configured and arranged to engage each other. For example, as shown in FIG. 4, the carrier 68, including a plurality of planet gears 64 (e.g., three planet gears 64) can be positioned within the planetary gear drive system 50 so that the teeth of the planet gears 64 can engage the teeth of the sun gear 62. As a result, in some embodiments, the sun gear 62 can transfer to the planet gears 64 at least a portion of the motor 26 output that the sun gear 62 receives from the first shaft 38a.

In some embodiments, the sun gear 62 can be configured and arranged to support and engage the carrier 68. As shown in FIGS. 4-7C, in some embodiments, the sun gear 62 can comprise a support flange 78. In some embodiments, the support flange 78 can radially extend from the sun gear 62 and can be configured and arranged to engage at least one of the collars 70, 72 (e.g., the first collar 70) of the carrier 68. For example, in some embodiments, the carrier 68 can be positioned so that the first collar 70 engages the support flange 78 to aid in positioning the carrier 68 and first clutch 54. Moreover, as shown in FIGS. 5 and 6, in some embodiments, one or more rings 80 or other structures capable of reducing friction can be disposed immediately between the support flange 78 and the carrier 68 to reduce friction between these two components when the planetary gear drive system 50 is activated (e.g., because both of these components will be moving). Also, although referred to as a ring 80, the ring 80 can comprise non-annular configurations. Moreover, in some embodiments, the ring 80 can comprise any configuration substantially similar to the shape of the support flange 78, the collar 72, and/or the sun gear 62.

As shown in FIGS. 4 and 6, in some embodiments, the drive ring gear 66 can at least partially circumscribe the sun gear 62, the planet gears 64, and/or the carrier 68. In some embodiments, the drive ring gear 66 can be positioned so that it can at least partially engage at least some of the plurality of planet gears 64. For example, in some embodiments, an inner surface of the drive ring gear 66 can comprise teeth that can be configured and arranged to engage the teeth of the planet gears 64. As a result, in some embodiments, the movement of the planet gears 64 arising from motor 26 output from the sun gear 62 engagement with the first shaft 38a can cause the drive ring gear 66 to move (e.g., rotate). As discussed in greater detail below, in some embodiments, the drive ring gear 66 can comprise a fixed configuration so that it does not move, regardless of movement by the planet gears 64 and the sun gear 62.

As shown in FIGS. 4-6, the first clutch 54 and the second clutch 56 can be configured and arranged so that the second clutch 56 at least partially circumscribes the first clutch 54. Furthermore, in some embodiments, the clutches 54, 56 can be configured and arranged to operate as conventional friction clutches or any other conventional clutch. For example, in some embodiments, the first clutch 54 and the second clutch 56 can comprise a plurality of clutch discs 82, as shown in FIGS. 4-6. In some embodiments, the drive ring gear 66, the carrier 68, and/or the housing 22 can be configured and arranged to engage the at least one of the first clutch 54 and the second clutch 56. For example, in some embodiments, the clutch discs 82 can be configured and arranged to engage multiple elements of the planetary gear drive system 50 to control output from the motor 26 to the pinion 32.

In some embodiments, the clutch discs 82 of the first clutch 54 can be configured and arranged to engage the carrier 68 and the drive ring gear 66. As shown in FIGS. 4-6, the first clutch 54 can comprise seven clutch discs 82, however, in other embodiments, the first clutch 54 can comprise any other number of clutch discs 82. In some embodiments, at least a portion of the clutch discs 82 can comprise different configurations. For example, as shown in FIG. 5, an inner diameter of a first set of clutch discs 82a can comprise a plurality of teeth 84 that are configured and arranged to engage teeth on an outer surface first collar 70. Moreover, in some embodiments, a second set of clutch discs 82b can comprise a plurality of teeth 84 on an outer diameter that are configured and arranged to engage the teeth on the inner surface of the drive ring gear 66. In some embodiments, the first set and second set of clutch discs 82a, 82b can be arranged in an alternating configuration. For example, as shown in FIGS. 4-6, a first clutch disc 82a can be disposed immediately adjacent to the support flange 78 and a second clutch disc 82b can be positioned immediately adjacent to the first clutch disc 82a. This pattern can be repeated one or more times until a desired number of clutch discs 82 are positioned to create the first clutch 54 (e.g., seven clutch discs 82).

Figure 7A:
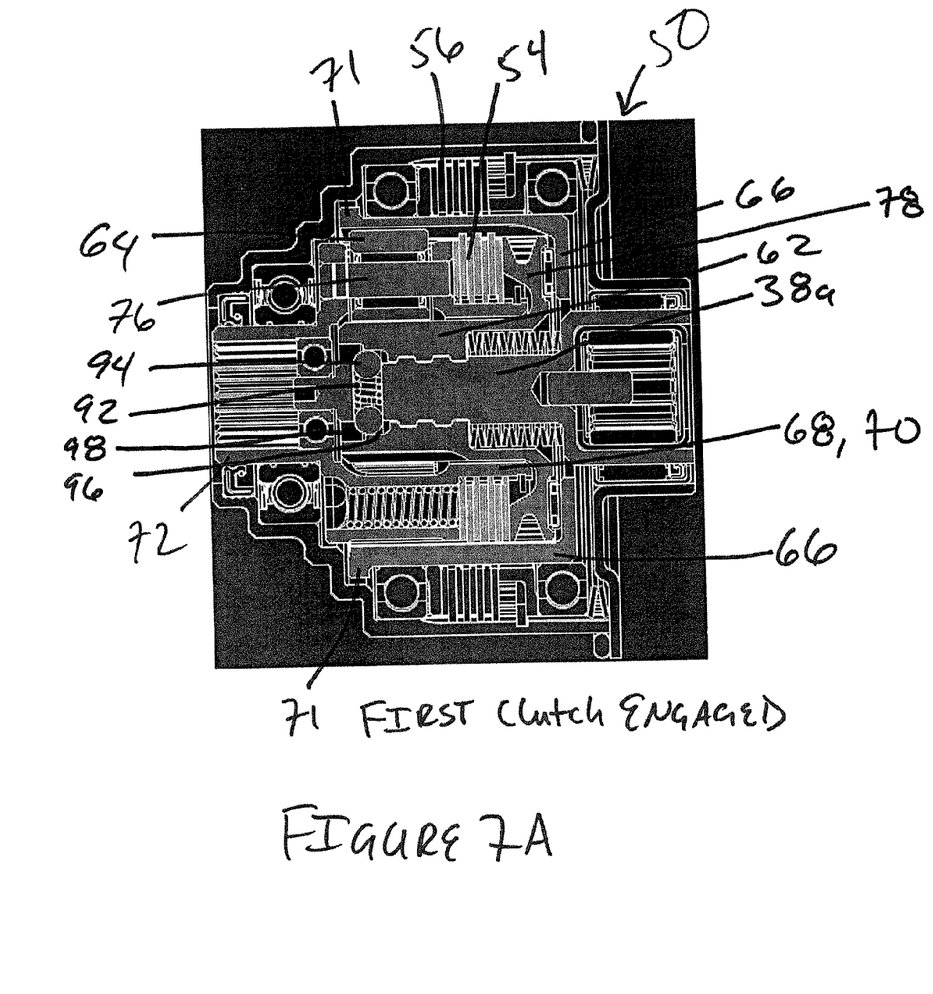
FIGS. 7A-7C are a cross-sectional view of a planetary gear drive system according to some embodiments of the invention.

In some embodiments, at least a portion of the sun gear 62 can contact and/or engage the first clutch 54. As shown in FIGS. 4, 6, and 7A, in some embodiments, the support flange 78 can axially contact the first clutch 54 to exert an axially-directed force on the first clutch 54. In some embodiments, as a result of exerting the axially-directed force, the first clutch 54 can be engaged, which can lead to the synchronous movement of the components engaging the first clutch 54 (i.e., the drive ring gear 66, the sun gear 62, and the carrier 68, including the planet gears 64). In some embodiments, as shown in FIGS. 4-6, a support member 69 can be positioned between an axially outer portion of the support flange 78 and an axially inner portion of the drive ring gear 66. In some embodiments, the support member 69 can be configured and arranged to reduce friction between the drive ring gear 66 and the sun gear 62 when these two elements are moving relative to each other and to reduce any potential damage occurring to the support flange 78 when it axially moves, as described in further detail below.

Moreover, as shown in FIG. 5, in some embodiments, the second clutch 56 can comprise a substantially similar configuration relative to the first clutch 54. For example, in some embodiments, the second clutch 56 can comprise a substantially similar alternating arrangement of first and second clutch discs 82a, 82b. In some embodiments, the plurality of teeth 84 of the first clutch discs 82a of the second clutch 56 can be configured and arranged to engage the teeth on the outer surface of the drive ring gear 66. Further, in some embodiments, the plurality of teeth 84 of the second clutch disc 82b of the second clutch 56 can be configured and arranged to engage teeth or similar features on an inner surface of the housing 22.

Additionally, in some embodiments, the second clutch 56 can comprise an alignment member 86. In some embodiments, a first portion 86a of the alignment member 86 can be positioned at an axial side of the second clutch 56 and a second portion 86b of the alignment member 86 can be positioned on another axial side of the second clutch 56. In some embodiments, the alignment member 86 can be configured and arranged to assist in positioning the first and second clutch discs 82a, 82b during assembly, reduce friction between the clutch discs 82 and elements immediately adjacent to the clutch discs 82 (e.g., the bearings 58, as shown in FIGS. 4-6), and to enhance load distribution against the clutch discs 82 upon engagement. Also, in some embodiments, the first clutch 54 can comprise a lesser number of clutch discs 82 relative to the second clutch 56. For example, as shown in FIGS. 4-6, in some embodiments, the first clutch 54 can comprise seven clutch discs 82 and the second clutch 56 can comprise eight clutch discs 82, however, the numbers of clutch discs 82 can vary with application and desire of the manufacturer or end user.

Figure 7B:
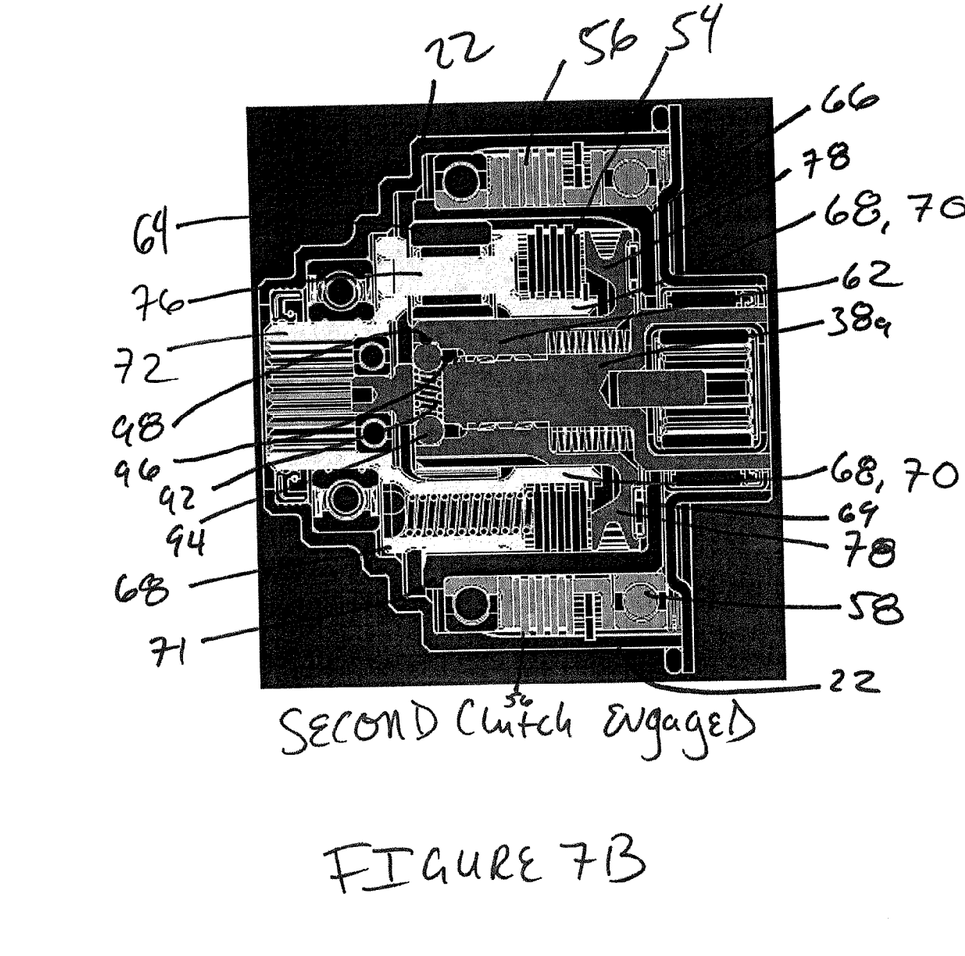
Figure 7C:
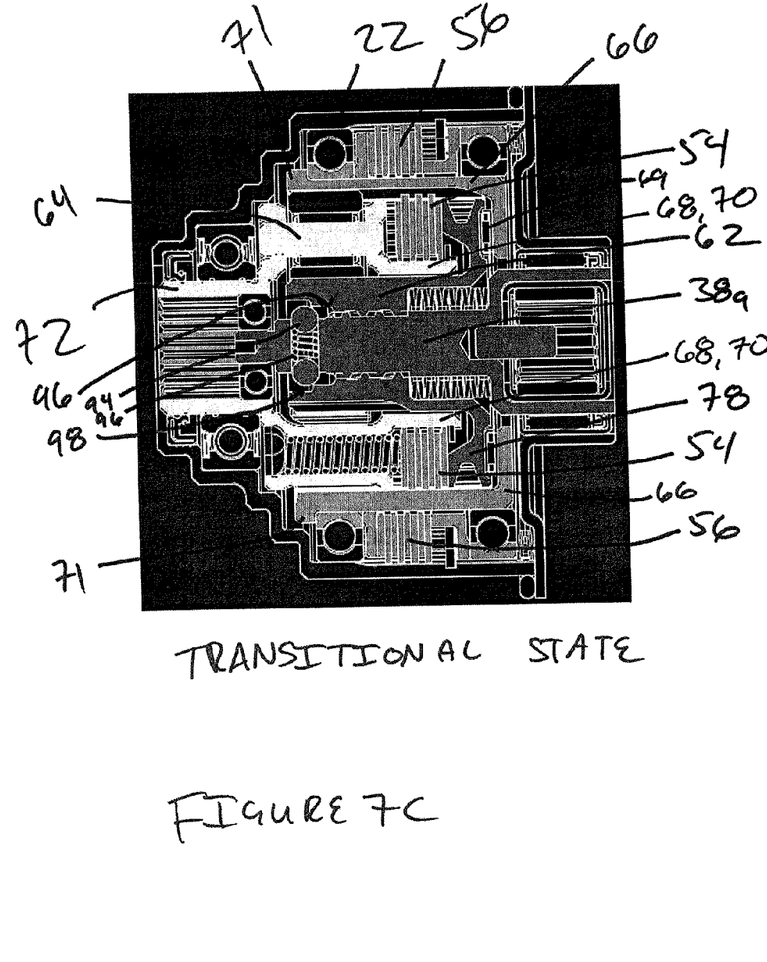
Figure 9:
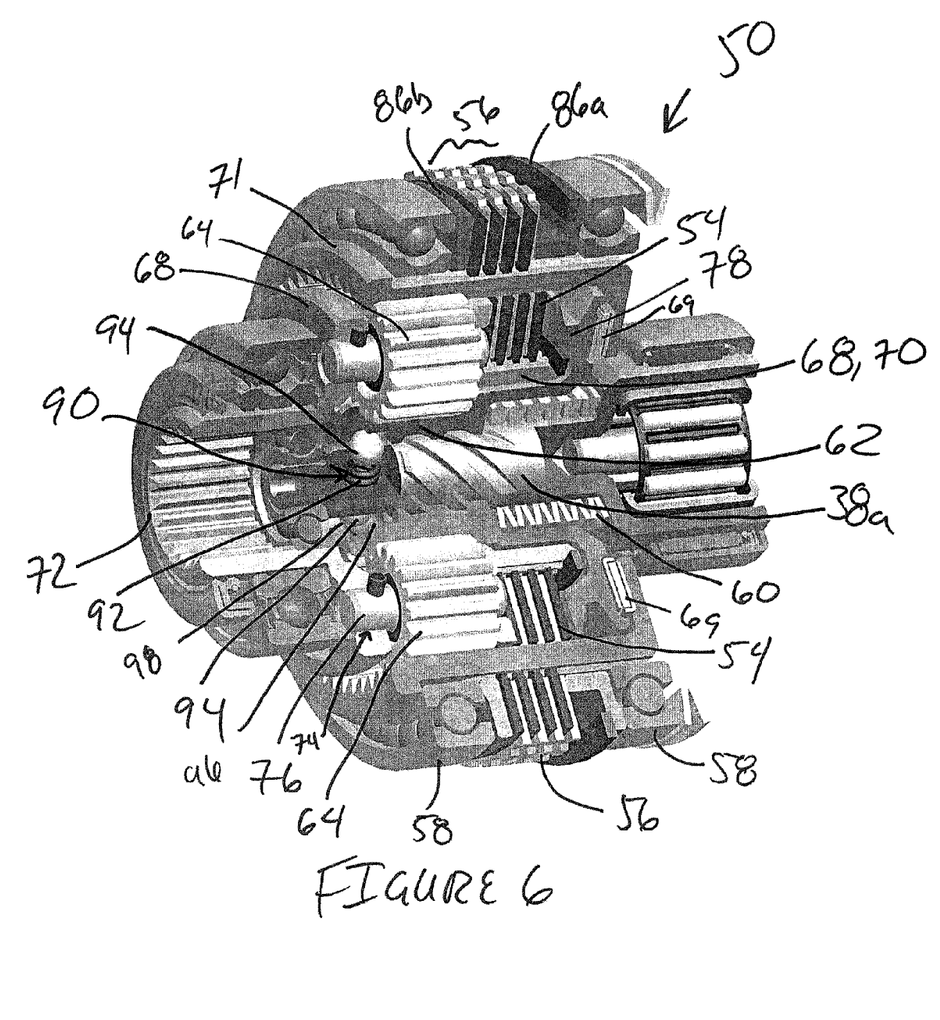

In some embodiments, at least a portion of the drive ring gear 66 can contact and/or engage the second clutch 56. As shown in FIGS. 4, 6, and 7B, in some embodiments, the sun gear 62 can axially move, which can cause the drive ring gear 66 to also axially move. As a result, in some embodiments, a lip 71 on the drive ring gear 66 can also cause at least some of the bearings 58 and to engage the second clutch 56. In some embodiments, the alignment member 86 can also function to reduce and/or eliminate some or all of the drag force associated with the engagement of the second clutch 56. In some embodiments, when the second clutch 56 is engaged, at least a portion of the clutch discs 82 can engage the housing 22 and the outer surface of the drive ring gear 66, which can lead to restricted movement of the components engaged with the second clutch 56 (e.g., the drive ring gear 66).

In some embodiments, the clutch biasing member 60 can circumscribe at least a portion of the first shaft 38a. As shown in FIGS. 4 and 6, in some embodiments, the clutch biasing member 60 can be positioned adjacent to both the first shaft 38a and the sun gear 62. For example, in some embodiments first shaft 38a can comprise a stop region 88 and the clutch biasing member 60 can be disposed between the splined portion of the sun gear 62 and the stop region 88. In some embodiments, the clutch biasing member 60 can be positioned to exert a biasing force on the sun gear 62. For example, as shown in FIGS. 4 and 6, the clutch biasing member 60 can exert an axial biasing force on the sun gear 62, which can result in a continued interaction between the helical splines of the ring gear 62 and the first shaft 38a. In some embodiments, however, the clutch biasing member 60 can be capable of being compressed to enable alternative operations of the planetary gear drive system 50.

In some embodiments, the carrier 68 can be coupled to the second shaft 38b. In some embodiments, an inner surface of the second collar 72 can comprise a generally splined configuration and/or teeth that can be configured and arranged to engage splines and/or teeth on the second shaft 38b (not shown). As a result of the engagement of the carrier 68 (e.g., via the second collar 72), motor 26 output can be transferred from the first shaft 38a, through the planetary gear drive system 50 to the second shaft 38b and the pinion 32. As previously mentioned, when the pinion 32 engages the ring gear 36 and begins moving, the starter machine 12 can start the engine 20.

In some embodiments, the planetary gear drive system 50 can operate in different modes depending on some conditions present within the starter machine 12. By way of example only, in some embodiments, under a first condition (e.g., a low torque condition), the first clutch 54 can be engaged. In some embodiments, under the first condition, the clutch biasing member 60 can be at least partially decompressed and it can exert an axial biasing force against the sun gear 62. As a result, the helical splines of the sun gear 62 and the first shaft 38a can remain engaged. Moreover, as shown in FIG. 7A, in some embodiments, under the low torque condition, the axial biasing force exerted against the sun gear 62 can assist in keeping the support flange 78 of the sun gear 62 engaged with the first clutch 54. As previously mentioned, when the support flange 78 engages the first clutch 54, the elements contacting the first clutch 54 can move in a substantially synchronous manner. For example, because the plurality of teeth 84 on both the first and second clutch discs 82a, 82b of the first clutch 54 can engage the teeth of the outer surface of the first collar 70 and the teeth of the inner surface of the drive ring gear 66, respectively, these elements, in addition to the sun gear 62 can be coupled together in a single moving element. Moreover, in some embodiments, because of the engagement of the first clutch 54, the individual planet gears 64 do not individually rotate. In some embodiments, because of the coupled nature of the carrier 68, the drive ring gear 66 and the sun gear 62, the elements of the planetary gear system 52 can rotate about an axis of the starter machine 12, however, because of the coupling, the individual planet gears 64 do not rotate about their individual axis, as would occur in some conventional planetary gear systems 52.

In some embodiments, when the first clutch 54 is engaged, the planetary gear drive system 50 can comprise a direct-drive configuration. As previously mentioned, the first shaft 38a can transfer the motor 26 output to the sun gear 62. In some embodiments, the motor 26 output can be directly transferred to the second collar 72 and the second shaft 38b, including the pinion 32, because the first clutch 54 is engaged. As previously mentioned, engagement of the first clutch 54 via the support flange 78 of the ring gear 62 can couple together the sun gear 62, the carrier 68, including the planet gears 64, and the drive ring gear 66. As a result, motor 26 output can be directly transferred to from the first shaft 38a to the second collar 72 because the sun gear 62, carrier 68, and drive ring gear 66 are all moving as a single element.

In some embodiments, under low torque conditions, the direct-drive configuration can enable the pinion 32 to move at speeds greater than a conventional starter machine 12. Some starter machines 12 are configured to output a significant amount of torque (e.g., to start an engine 20 that has not recently been started), which requires a reduction in speed from the motor 26 to the pinion 32. For example, some conventional gear trains 24 can comprise a conventional planetary gear configuration that can enable an increase in the amount of torque transferred to the pinion 32 from the motor 26. However, the conventional configuration limits the speeds at which the pinion 32 can move (e.g., rotate) so that if the starter machine 12 is operating under low torque conditions where greater speeds are needed (e.g., starting an engine 20 that is inactive but includes a moving ring gear 36), at least some conventional starter machines 12 cannot meet the necessary requirements. As previously mentioned, the direct-drive configuration can enable a starter machine 12 comprising a planetary drive gear system 50 to operate at speeds substantially similar to those of the motor 26 (i.e., greater than those of conventional starter machines 12).

In some embodiments, the planetary gear drive system 50 can operate under other conditions. In some embodiments, the planetary gear drive system 50 can operate in another mode of operation when the starter machine 12 is under a second condition (e.g., a high torque condition). In some embodiments, although the clutch biasing member 60 can exert the axially-directed biasing force against the sun gear 62 so that the sun gear 62 compresses the clutch biasing member 60. For example, under a high torque condition (e.g., the pinion 32 engaged with, and trying to rotate, a stationary ring gear 36), the torque necessary to move the pinion 32 and anything engaged with the pinion 32 can be translated back through the second shaft 38b to the carrier 68 and other portions of the planetary gear drive system 50. As a result, when the motor 26 output moves the first shaft 38a (e.g., rotates the first shaft 38a), the high torque condition can substantially retard the ability of the sun gear 62 to synchronously move with the first shaft 38a. Accordingly, in some embodiments, under a high torque condition, the sun gear 62 can axially move toward the stop region 88 and can at least partially compress the clutch biasing member 60. In some embodiments, although the sun gear 62 moves axially inward toward the stop region 88, the sun gear 62 can at least partially remain engaged with the first shaft 38a so that motor 26 output can continue to be transmitted to the sun gear 62, as shown in FIG. 7B (e.g., the motor 26 output can be translated into a thrust force to engage and/or disengage the first and second clutches 54, 56 without the need and/or use of a starter machine 12 control module, a valve body, and/or any other expensive or complex components).

In some embodiments, as a result of the sun gear 62 at least partially disengaging from the first shaft 38a, first clutch 54 can be disengaged. For example, in some embodiments, when the sun gear 62 moves, the support flange 78 can disengage from the first clutch 54, which, in turn can uncouple the carrier 68 and the drive ring gear 66. Accordingly, in some embodiments, once the first clutch 54 is disengaged, the carrier 68 can move substantially or completely independent of the drive ring gear 66.

In some embodiments, as the support flange 78 disengages from the first clutch 54, it can also aid in engaging the second clutch 56. As shown in FIG. 7B, in some embodiments, the axial movement of the sun gear 62 and support member 78 can lead to the engagement of the second clutch 56. For example, in some embodiments, when the support flange 78 axially moves in response to the sun gear's 62 movement, the support flange 78 can engage the support member 69 and the drive ring gear 66, as shown in FIG. 7B. As a result, the drive ring gear 66 can also be axially moved, which can lead to engagement of the second clutch 56. For example, as previously mentioned, as the drive ring gear 66 axially moves, the lip 71 can cause the bearings 58 immediately adjacent to the second clutch 56 to engage the alignment member 86, which can engage the second clutch 56 the outer surface of the drive ring gear 66 and the inner surface of the housing 22 (i.e., the drive ring gear 66 can be coupled to the housing 22 when the second clutch 56 is engaged).

In some embodiments, when the second clutch 56 is engaged, the planetary gear drive system 50 can operate substantially similar to a conventional gear train 24. As previously mentioned, the first shaft 38a can transfer the motor 26 output to the sun gear 26. In some embodiments, the motor 26 output can be transferred to the second collar 72 and the second shaft 38, including the pinion 32 via the planetary gear system 52, because the second clutch 56 is engaged. As previously mentioned, engagement of the second clutch 56 can lead to the drive ring gear 66 being coupled to the inner surface of the housing 12 via the second clutch 56. As a result, the drive ring gear 66 can comprise a substantially or completely immobile configuration, which can lead to translation of at least a portion of the motor 26 output through the planetary gear system 52 prior to movement of the second shaft 38b. By way of example only, in some embodiments, the planetary gear system 52 can comprise a gear ratio of approximately 3.36:1 so that the rotational speed of the motor 26 is not directly translated to pinion 32 speed, but rather the output from the carrier 68 to the second shaft 38b and the pinion 32 can comprise a greater amount of torque to address the high torque condition (i.e., the planetary gear drive system 50 can be configured to operate as conventional starter machine 12 under high torque conditions). In other embodiments, the planetary gear system 52 can comprise other gear ratios. Accordingly, in some embodiments, the planetary gear drive system 50 can be configured and arranged to operate in different modes under different torque conditions (e.g., a high torque condition versus a lower torque condition).

In some embodiments, the engagement of the first clutch 54 can comprise a default state. In some embodiments, after substantial or complete dissipation of the second condition (e.g., the high torque condition), the planetary gear drive system 50 can return to a state where the first clutch 54 is engaged (i.e., the carrier 68 is coupled to the sun gear 62 and the drive ring gear 66). For example, once the need for greater torque output dissipates, the axially-directed force compressing the clutch biasing member 60 can similarly dissipate so that the clutch biasing member 60 can expand and re-exert the biasing force on the sun gear 62 to return to a home position (e.g., the position of the sun gear 62 prior to the higher torque condition). Moreover, in some embodiments, as the sun gear 62 returns to the home position, the lip 71 can release engagement of the second clutch 56 and the support flange 78 can re-engage the first clutch 54. As previously mentioned, in some embodiments, the planetary gear drive system 50 can return to the configuration where the second clutch 56 is engaged under conditions requiring greater torque output.

As shown in FIGS. 6 and 7, in some embodiments, the planetary gear drive system 50 can comprise a hysteresis member 90. In some embodiments, the hysteresis member 90 can be configured and arranged to stabilize engagement of the first and second clutches 54, 56. For example, in some embodiments, the torque output required of the starter machine 12 can comprise a medial and/or transitional magnitude between the first condition (e.g., a lesser torque requirement) and the second condition (e.g., a greater torque requirement). In some embodiments, the hysteresis member 90 can be configured and arranged to retain engagement of the clutch 54, 56 that is currently engaged when the torque required of the starter machine 12 enters the transitional range.

In some embodiments, the hysteresis member 90 can comprise a hysteresis biasing member 92 and a plurality of hysteresis engagement members 94. As shown in FIGS. 6 and 7, in some embodiments, the hysteresis member 90 can be disposed through at least a portion of the first shaft 38a. For example, in some embodiments, the hysteresis biasing member 92 can be disposed through the first shaft 38a and the hysteresis engagement members 94 can be coupled to ends of the hysteresis biasing member 92 at opposite radial sides of the first shaft 38a. As shown in FIGS. 6 and 7, the hysteresis engagement members 94 can comprise a generally round or circular configuration which can reduce friction between the hysteresis member 90 and any planetary gear drive system 50 components that engage the hysteresis member 90.

In some embodiments, the sun gear 62 can be configured and arranged to engage the hysteresis member 90. For example, in some embodiments, the sun gear 62 can comprise a first recess 96 and a second recess 98 that are configured and arranged to receive at least a portion of the hysteresis member 90 (e.g., the hysteresis engagement members 94). In some embodiments, the first recess 96 can be disposed substantially adjacent to the helical splines of the sun gear 62 and the second recess 98 can be disposed adjacent (e.g., axially outward) to the first recess 96. For example, in some embodiments, under the first condition (e.g., a lesser torque condition), the hysteresis biasing member 92 can remain substantially compressed within the first shaft 38a so that the hysteresis engagement members 94 contact the first recess 96 of the sun gear 62. The engagement of the hysteresis engagement members 94 and the sun gear 62 can at least partially assist in retaining the sun gear 62 in engagement with the first clutch 54 during the transitional torque requirement stage. Once the second condition arises (e.g., a great enough torque condition to cause the engagement of the second clutch 56), as the sun gear 62 moves axially inward, the hysteresis member 90 can disengage from the first recess 96 and engage the second recess 98. For example, the second recess 98 can comprise a greater recessed region of the sun gear 62 (e.g., the second recess 98 can include a diameter greater than a diameter of the first recess 96) so that when the hysteresis engagement members 94 engage the second recess 98, the hysteresis biasing member 92 can decompress (e.g., expand) to ensure engagement between the sun gear 62 and the hysteresis member 90. As a result, the engagement of the hysteresis member 90 and the second recess 98 can assist in retaining the engagement of the second clutch 56 during the second condition. Moreover, in some embodiments, in order to return to engagement of the first clutch 54, the magnitude of the torque requirement needs to drop to a level where the force exerted by the clutch biasing member 60 and the thrust of the first shaft 38a to return to full engagement with the sun gear 62 overcomes the force exerted by the hysteresis member 90 on the second recess 98. Additionally, the inclusion of the hysteresis member 90 can aid in easing the transition between engagement of the first and second clutches 54, 56, which can lead to less vibration and other shuddering during the transition between engagement of the first and second clutches 54, 56.

In some embodiments, the starter machine 12 can comprise other configurations. In some embodiments, the overrunning clutch 30 can be disposed in multiple positions to enhance the manufacture of the machine 12. For example, in some embodiments, the overrunning clutch 30 can be installed within the planetary gear drive system 50 and/or adjacent to the planetary gear drive system 50 along the first shaft 38a, as opposed to being positioned along the second shaft 38b, as is done in some conventional starter machines 12. As a result of this positioning, the overall size of the clutch 30 can be reduced and readily available parts and supplies can be used in its assembly, leading to improved manufacturing processes.

In addition to the conventional engine 20 starting episode (i.e., a "cold start" starting episode) previously mentioned, the starter machine 12 can be used in other starting episodes. In some embodiments, the starter machine 12 can be configured and arranged to enable a "stop-start" starting episode. For example, the starter machine 12 can start an engine 20 when the engine 20 has already been started (e.g., during a "cold start" starting episode) and the vehicle continues to be in an active state (e.g., operational), but the engine 20 is temporarily inactivated (e.g., the engine 20 has substantially or completely ceased moving).

Moreover, in some embodiments, in addition to, or in lieu of being configured and arranged to enable a stop-start starting episode, the starter machine 12 can be configured and arranged to enable a "change of mind stop-start" starting episode. The starter machine 12 can start an engine 20 when the engine 20 has already been started by a cold start starting episode and the vehicle continues to be in an active state and the engine 20 has been deactivated, but continues to move (i.e., the engine 20 is decelerating). For example, after the engine receives a deactivation signal, but before the engine 20 substantially or completely ceases moving, the user can decide to reactivate the engine 20 so that the pinion 32 engages the ring gear 36 as the ring gear 36 is decelerating, but continues to move (e.g., rotate). After engaging the ring gear 36, the motor 26 can restart the engine 20 via the pinion 32 engaged with the ring gear 36. In some embodiments, the starter machine 12 can be configured for other starting episodes, such as a conventional "soft start" starting episodes (e.g., the motor 26 is at least partially activated during engagement of the pinion 32 and the ring gear 36).

The following discussion is intended as an illustrative example of some of the previously mentioned embodiments employed in a vehicle, such as an automobile, during a starting episode. However, as previously mentioned, the starter machine 12 can be employed in other structures for engine 20 starting.

As previously mentioned, in some embodiments, the starter machine 12 can be configured and arranged to start the engine 20 during a change of mind stop-start staring episode. For example, after a user cold starts the engine 20, the engine 20 can be deactivated upon receipt of a signal from the electronic control unit 16 (e.g., the vehicle is not moving and the engine 20 speed is at or below idle speed, the vehicle user instructs the engine 20 to inactivate by depressing a brake pedal for a certain duration, etc.), the engine 20 can be deactivated, but the vehicle can remain active (e.g., at least a portion of the vehicle systems can be operated by the power source 14 or in other manners). At some point after the engine 20 is deactivated, but before the engine 20 ceases moving, the vehicle user can choose to restart the engine 20 by signaling the electronic control unit 16 (e.g., via releasing the brake pedal, depressing the acceleration pedal, etc.). After receiving the signal, the electronic control unit 16 can use at least some portions of the starter machine 12 to restart the engine 20.

In some embodiments, the planetary gear drive system 50 can be configured and arranged to operate during at least some of these different starting episodes. As previously mentioned, in some embodiments, the planetary gear drive system 50 can operate substantially similar to a conventional starter machine 12 (e.g., enable a "cold start" for an engine 20). In some embodiments, upon receiving a starting signal (e.g., the user turning the key to being vehicle operations), the solenoid assembly 28 can be activated and the pinion 32 can engage the ring gear 36 of the engine. Also, the motor 26 can be activated and begin transmitting output to the pinion 32 through the planetary gear drive system 50. Accordingly, because of the immobile nature of the ring gear 36 during a "cold start," the starter machine 12 is operating in a second condition environment (e.g., a greater torque output is needed to start the engine). As a result of the second condition, in some embodiments, the sun gear 62 can disengage from the first clutch 54 and cause the drive ring gear 66 to engage the second clutch 54. After engaging the second clutch 56, the motor 26 output is translated through the planetary gear system 52 to reduce rotational speed of the output, but increase torque output. Accordingly, the motor 26 output can be translated to the pinion 32 with torque sufficient to enable a cold start at a first rotational speed (e.g., about one hundred twenty revolutions per minute). As a result, the starter machine 12 can start the cold engine 20 so that the vehicle can begin operations.

In some embodiments, the starter machine 12 comprising the planetary gear drive system 50 can enable other starting episodes. In some embodiments, the planetary gear drive system 50 can enable a change-of-mind starting episode. For example, when the rotational speed of the ring gear 36 is decelerating (e.g., because the engine 20 has been deactivated), the planetary gear drive system 50 can enable restarting of the engine 20. In some embodiments, when the starter machine 12 receives a restart signal as the ring gear 36 is still moving (i.e., a change-of-mind restart starting episode), the planetary gear drive system 50 can enable the pinion 32 to move at speeds greater than those available with conventional starter machines, as previously mentioned. For example, during ring gear 36 deceleration, the starter machine 12 can receive a restart signal, which can lead to solenoid assembly 28 and motor 26 activation. However, unlike a "cold start" starting episode, the starter machine 12 would be under a first condition (e.g., a lesser torque requirement) because the ring gear 36 and crankshaft are already in motion (i.e., less inertia to overcome to start the engine 20). As a result, the first clutch 54 can remain engaged so that the sun gear 62, carrier 68, and drive ring gear 66 comprise a coupled configuration (i.e., a direct-drive configuration) so that the motor 26 output is not augmented by the planetary gear system 52 and the pinion 32 moves at speeds substantially similar to those of the motor 26 (e.g., approximately three hundred forty revolutions per minute, although this number can be lesser or greater depending on the motor 26 employed). Accordingly, the starter machine 12 comprising the planetary gear drive system 50 can enable a change-of-mind starting episode and restart the engine 20 more quickly than a conventional starter machine 12 because the conventional starter machine 12 with a conventional gear train 24 lacks the capacity to move the pinion 32 at such speeds. For example, a conventional starter machine 12 with a conventional gear train 24 comprising the same motor 26 will only be able to move the pinion 32 at a maximum speed of about one hundred revolutions per minute less than a starter machine 12 comprising the planetary gear drive system 50.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A starter machine comprising:
   a motor being operatively coupled to a first shaft;
   a pinion being operatively coupled to a second shaft;
   a planetary gear drive system being operatively coupled to the first shaft and the second shaft, the planetary gear drive system comprising a planetary gear system and a first clutch being disposed substantially adjacent to a second clutch; and
   the planetary gear drive system being configured and arranged so that when the first clutch is engaged, the motor rotates the pinion at a first rotational speed and when the second clutch is engaged, the motor rotates the pinion at a second rotational speed that is lower than the first rotational speed.

2. The starter machine of claim 1 and further comprising a solenoid assembly coupled to one of the second shaft and the pinion, and wherein the solenoid assembly is configured and arranged to move the pinion in a generally axial direction.

3. The starter machine of claim 1, wherein the planetary gear system comprises a sun gear coupled to the first shaft, at least one planet gear engaging the sun gear and being at least partially supported by a carrier, and a ring gear engaging the planet gear.

4. The starter machine of claim 3, wherein the first clutch at least partially engages an inner surface of the ring gear and the carrier.

5. The starter machine of claim 3 and further comprising a housing being configured and arranged to receive at least the motor and the planetary gear drive system and wherein the second clutch at least partially engages a surface of the ring gear and a surface of the housing.

6. The starter machine of claim 3, wherein the carrier is coupled to the second shaft.

7. The starter machine of claim 3, wherein the sun gear is coupled to the first shaft using a spline.

8. The starter machine of claim 1 and further comprising at least one clutch biasing member being at least partially disposed adjacent to a portion of the first shaft.

9. The starter machine of claim 8, wherein the clutch biasing member is configured and arranged to compress and decompress to aid in engaging the second clutch and the first clutch, respectively.

10. The starter machine of claim 1, wherein planetary gear drive system is configured and arranged so that the motor transfers a greater amount of torque to the pinion when the second clutch is engaged relative to the when the first clutch is engaged.

11. The starter machine of claim 1, wherein the first rotational speed is at least two hundred revolutions per minute greater than the second rotational speed.

12. A starter machine comprising:
   a motor being operatively coupled to a first a shaft and at least partially disposed within a housing; and
   a planetary gear drive system being at least partially coupled to the housing and being operatively coupled to the first shaft and a second shaft, the planetary gear drive system further comprising
      a sun gear being coupled to the first shaft, a plurality of planet gears engaging the sun gear, the plurality of sun gears being at least partially supported by a carrier, a ring gear engaging the plurality of planet gears and the sun gear,
      a first clutch being at least partially coupled to the carrier and an inner surface of the ring gear, wherein a portion of the sun gear is capable of engaging the first clutch,
      a second clutch being at least partially coupled to an outer surface of the ring gear and an inner surface of the housing, and wherein the planetary gear drive system is configured and arranged to engage the first clutch under a first torque condition and engage the second clutch under a second torque condition.

13. The starter machine of claim 12, wherein the first torque condition comprises a lesser torque value than does the second torque condition.

14. The starter machine of claim 12 and further comprising a pinion coupled to the second shaft.

15. The starter machine of claim 14, wherein the planetary gear drive system is configured and arranged so that when the first clutch is engaged, the motor is capable of moving the pinion at a first rotational speed and when the second clutch is engaged, the motor is capable of moving the pinion at a second rotational speed, and wherein the first rotational speed comprises a greater rotational speed than the second rotational speed.

16. The starter machine of claim 12 and further comprising at least one clutch biasing member being at least partially disposed around a portion of the first shaft, and wherein the clutch biasing member is configured and arranged to be compressed and be decompressed to engage the second clutch and the first clutch, respectively.

17. The starter machine of claim 12 and further comprising a hysteresis member being at least partially disposed through a portion of the first shaft.

18. The starter machine of claim 12, wherein the planetary gear drive system further comprises an overrunning clutch.

19. A method of assembling a starter machine, the method comprising:
   coupling a motor to a first shaft;
   coupling a pinion to a second shaft;
   coupling a planetary gear drive system to the first shaft and the second shaft, the planetary gear drive system comprising a planetary gear system and a first clutch being substantially adjacent to a second clutch; and
   configuring the planetary gear drive system so that when the first clutch is engaged, the motor rotates the pinion at a first rotational speed and when the second clutch is engaged, the motor rotates the pinion at a second rotational speed that is lower than the first rotational speed.

20. The method of claim 19 and further comprising at least partially disposing a hysteresis member through a portion of the first shaft.

* * * * *